United States Patent [19]

Ertl et al.

[11] 4,412,838

[45] Nov. 1, 1983

[54] PROCESS FOR RECOVERING POTASSIUM CHLORIDE

[75] Inventors: Dietrich Ertl, Königstein; Dieter Ueberle, Frankfurt am Main, both of Fed. Rep. of Germany

[73] Assignee: Metallgesellschaft Aktiengesellschaft, Frankfurt am Main, Fed. Rep. of Germany

[21] Appl. No.: 204,532

[22] Filed: Nov. 6, 1980

Related U.S. Application Data

[63] Continuation of Ser. No. 1,320, Jan. 5, 1979, abandoned.

[30] Foreign Application Priority Data

Jan. 16, 1978 [DE] Fed. Rep. of Germany ....... 2801705

[51] Int. Cl.$^3$ .............................................. B01D 9/02
[52] U.S. Cl. .................................................. 23/302 R
[58] Field of Search ............. 23/296, 297, 299, 302 R, 23/298; 423/181, 182, 205, 208

[56] References Cited

U.S. PATENT DOCUMENTS

| | | | |
|---|---|---|---|
| 1,182,668 | 5/1916 | Firebargh | 23/296 |
| 2,188,932 | 2/1940 | Weinig | 23/296 |
| 2,448,191 | 8/1948 | Pike | 23/296 |
| 2,927,010 | 3/1960 | Le Baron | 23/297 |
| 3,910,773 | 10/1975 | Garrett | 23/297 |

FOREIGN PATENT DOCUMENTS

| | | |
|---|---|---|
| 374017 | 4/1923 | Fed. Rep. of Germany. |
| 1064044 | 2/1960 | Fed. Rep. of Germany. |
| 1226090 | 4/1967 | Fed. Rep. of Germany. |
| 1567985 | 10/1970 | Fed. Rep. of Germany. |

Primary Examiner—Hiram H. Bernstein
Attorney, Agent, or Firm—Karl F. Ross; Herbert Dubno

[57] ABSTRACT

Potassium chloride of at least technical grade is recovered from sylvinite or sylvinite-like starting materials (sylvite) by leaching with hot mother liquor recycled from a crystallizing stage, the residue consisting substantially of sodium chloride is separated and the solution is cooled to crystallize the potassium chloride. In order to avoid losses of potassium chloride and to reduce problems relating to equipment materials in separating water-insoluble impurities the finely ground starting materials are treated at ambient temperatures with a solution which is saturated with sodium chloride and potassium chloride, and water-soluble impurities are entrained with the solution. The solution is then separated from the water-insoluble impurities and is recycled at least in part to produce the pulp. The moist salt mass resulting from the separation consists substantially of potassium chloride and sodium chloride and is contacted with a solution which comes from the crystallizing stage and is saturated with sodium chloride and potassium chloride. The solution enriched with potassium chloride is separated from the residue, which contains mainly sodium chloride, and the separated solution is virtually saturated with potassium chloride by the addition of potassium chloride and is crystallized.

9 Claims, 1 Drawing Figure

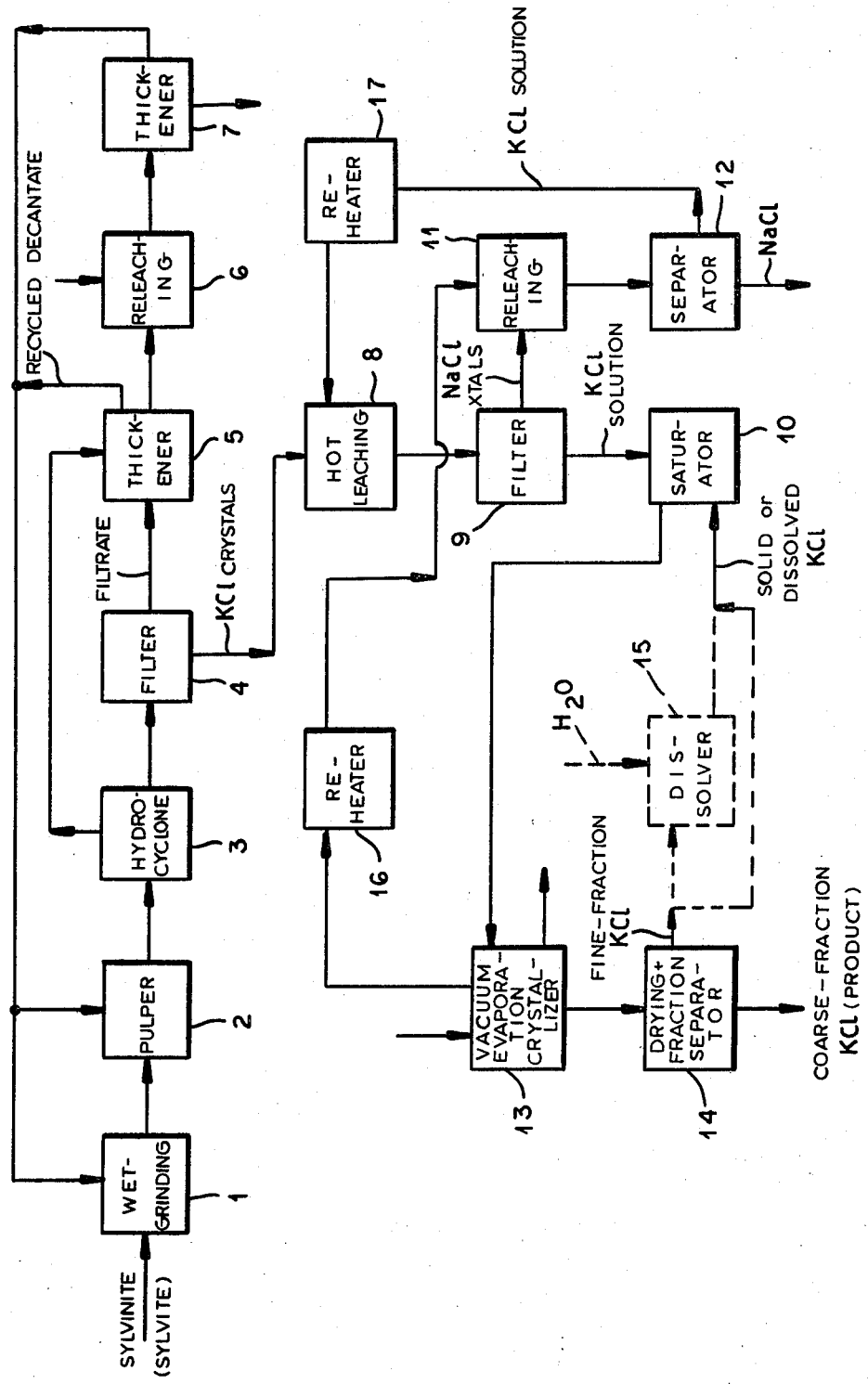

PROCESS FOR RECOVERING POTASSIUM CHLORIDE

CROSS REFERENCE TO RELATED APPLICATION

This application is a continuation of application Ser. No. 1,320 filed 5 Jan. 1979 (now abandoned).

FIELD OF THE INVENTION

This invention relates to a process for recovering potassium chloride in large crystals and of at least technical grade from sylvinite or sylvinite-like starting materials (sylvite), in which the starting materials are leached with hot mother liquor from a crystallizing stage, the residue consisting substantially of sodium chloride is separated, and the solution is cooled to crystallize potassium chloride.

BACKGROUND OF THE INVENTION

It is known to separate the chlorides of potassium and sodium, which are the main components of sylvinite (sylvitic minerals), in a step in which the differential change in solubility of sodium chloride and potassium chloride in response to temperature changes is utilized. In the technologically interesting temperature range from about 20° to 110° C. the solubility of sodium chloride in the system potassium chloride/sodium chloride/water does not exhibit a significant change whereas the solubility of potassium chloride is more than doubled in response to an increase in temperature through this range.

For this reason it is conventional to leach sylvinite with reheated mother liquor recycled from a crystallizing stage so that potassium chloride is mainly dissolved and sodium chloride remains in the residue. The resulting liquor is then freed from other water-insoluble constituents, which are almost always present in sylvinite. The solution thus obtained is cooled to crystalline potassium chloride and is then reheated and recycled to the hot leaching step. (See Ullmann's *Enzyklopadie der Techn. Chemie,* 3rd edition, 1957, vol. 9, pages 185 et seq.).

In order to remove potassium chloride as completely as possible, a modification of the usual concurrent leaching process utilizes a main leaching stage, in which a major quantity of potassium chloride is dissolved in solvent liquor, and an after-leaching stage, in which remaining potassium chloride is dissolved also in fresh solvent liquor, and the last solution obtained is fed to the main leaching stage and is strengthened therein (see Ullmann's, loc.cit., page 189).

While the process outlined above is widely used, it has the disadvantage that a considerable amount of potassium chloride is lost in the water-insoluble sludges, to which a considerable amount of solution adheres, unless these losses are decreased by expensive washing steps.

Another disadvantage is that the thickening of the sludge and any washing thereof must be carried out at temperatures at which the liquors are highly corrosive so that special materials must be used in the equipment in which the treatment is carried out.

OBJECT OF THE INVENTION

An object of the invention is to provide a process in which the disadvantages of the known processes, particularly the disadvantages mentioned above, can be eliminated and which nevertheless does not involve a considerable additional equipment expenditure.

SUMMARY OF THE INVENTION

This object and others which will become apparent hereinafter, are accomplished in that the process is carried out in accordance with the invention by the combination of the following steps:

(a) the coarsely ground starting materials are finely ground;

(b) the finely ground starting materials from step (a) are treated (pulped) at ambient temperatures with a solution which is saturated with sodium chloride and potassium chloride, and water-soluble impurities are entrained from the treating vessel with the solution;

(c) the solution from step (b) is separated from the water-insoluble impurities and the liquid phase (solution) is recycled at least in part to produce the pulp in step (b);

(d) the moist salt mass which is obtained from the pulp in step (b) and consists substantially of potassium chloride and sodium chloride and from which water-insoluble impurities have been removed to a high degree is contacted with a solution which comes from a crystallizing stage and is saturated with sodium chloride and potassium chloride, this contacting step being carried out so that a suspension at a temperature of at least 95° C. is obtained;

(e) from this step, the solution which has been enriched with potassium chloride is separated from the solid phase, which contains mainly sodium chloride, and the separated solution is virtually saturated with potassium chloride by an addition of potassium chloride; and (f) the solution obtained in step (e) is crystallized.

The term "sylvinite-like starting materials" identifies starting materials which are similar to sylvinite in chemical composition in that they consist mainly of potassium chloride and sodium chloride and do not contain sulfate in more than negligible amounts.

In the process according to the invention the starting materials are finely ground (step (a)) preferably so the 90% of the ground material has a particle size below 1.0 mm.

By this fine grinding, the water-insoluble impurities are virtually completely exposed so that they can be separated with the solution and are thus removed from the residue which contains sodium chloride and potassium chloride.

Another advantage afforded by the fine grinding is that the potassium chloride can be more quickly dissolved in hot mother liquor which has been recycled from the crystallizing stage. As a result, the residence time in the leaching stage can be decreased so that a smaller reactor can be used for a given throughput rate or a reactor having given dimensions can be operated at a high throughput rate.

The fine grinding is desirably effected by wet grinding in the presence of a solution which is saturated with sodium chloride and potassium chloride and which is added at a weight ratio of 1:1.5 to 1:2.5 of solids to solution. This measure ensures that the formation of fine particles below 0.06 mm, which are separated in the succeeding separating stage from the coarser particles, is kept within tolerable limits and is restricted substantially to the water-insoluble impurities.

In step (b), the finely ground starting material is pulped (converted into a slurry) at ambient temperatures with a solution which is saturated with sodium chloride and potassium chloride. The pulping is preferably effected with 4 to 6 parts by weight of the solution per part by weight of the starting material. If the starting materials have been subjected to wet grinding, the quantity of solution added for this wet grinding must be taken into account in the weight ratio of 1:4 to 1:6.

The pulp is then fed (step (c)) to a separator, preferably a hydrocyclone, in which the water-insoluble impurities are separated from the crystal pulp, mainly with the aid of the pulping liquor. The liquor which contains the water-insoluble impurities is thickened and freed from sludge and at least part and generally all of the resulting solution is recycled to the pulping step and to the wet-grinding step.

The moist crystal mass which is taken from the separator is suitably filtered and then fed to the hot leaching stage (step (d)), in which the pulp is contacted with reheated mother liquor which has been recycled from the crystallizing stage. The mother liquor may be reheated so that the resulting mixture has an initial temperature of at least 95° C. Alternatively, the resulting final temperature can be obtained in that the mixture is additionally heated, e.g., by an injection of steam. When sufficient contact has been effected, the hot solution is separated from the insolubles, which consist mainly of sodium chloride. The residue is suitably releached for a recovery of any small residues of potassium chloride. A reheated partial stream of mother liquor from the crystallizing stage may be used for this purpose and is subsequently fed to the main leaching stage. It will be particularly suitable to releach with mother liquor which has been recycled from the crystallizing step and has been reheated only slightly, preferably not in excess of 50° C., and which after the releaching liquor is reheated once more is supplied to the hot leaching stage.

The solution which has been enriched with potassium chloride and withdrawn from the main leaching stage and has been filtered is subsequently virtually saturated (step (e)) with potassium chloride by an addition of potassium chloride supplied in solid form or as a virtually saturated aqueous solution. Potassium chloride has a much higher saturation concentration in water alone than in water which is saturated with sodium chloride. As a result, even the addition of potassium chloride in an aqueous solution will increase the concentration of potassium chloride in the system of potassium chloride/sodium chloride/water.

Potassium chloride produced by the present process is usually employed as a source of potassium chloride used in the process for the saturation in step (e). It is particularly desirable to saturate the solution by the addition of fine-grained potassium chloride made available during the crystallizing step or in the succeeding drying step.

The solution which is virtually saturated with potassium chloride is crystallized (step (f)), suitably in a plurality of stages operated under progressively decreasing pressures. Depending on the nature of the crystallizers which are employed, the fine potassium chloride crystals formed in the crystallization may be withdrawn from the crystallizers in a dispersion and separated from the latter. Alternatively, fine crystals may be separated by sieving after the conventional drying.

In a preferred embodiment of the invention, the leaching cycles, the addition of water, etc. are so controlled that the leaching solvents contain magnesium chloride in a concentration of 10 to 45 gram per liter. In that case virtually all magnesium chloride contained in the starting materials can be removed together with the water-insoluble impurities and the common salt.

The main advantages afforded by the process according to the invention are the following:

The water-insoluble impurities are separated at ambient temperature so that corrosion problems are alleviated. Owing to the relatively low concentration of potassium chloride at ambient temperatures, only small quantities of potassium chloride are lost with solution adhering to the impurities.

The several stages of the process are separated from each other as far as the solvent cycles are concerned. This facilitates the control of the process and ensures that changes in one stage of the process will not influence the process as a whole. The high concentration of potassium chloride in the highly reheated solution which is fed to the crystallizing stage promotes the formation of a high proportion of coarse crystalline potassium chloride.

The preferred embodiment of the invention comprising a releaching to recover residual potassium chloride ensures a high yield of potassium chloride. The adjustment of a low concentration of magnesium chloride greatly promotes the recovery of a product of high purity.

The invention will now be explained more fully and by way of example with reference to the drawing and an Example.

BRIEF DESCRIPTION OF THE DRAWING

The drawing is a flow diagram representing the process according to the best mode currently known to us for carrying out the invention.

SPECIFIC DESCRIPTION

Sylvinite is ground in a wet-grinding stage 1 in a solution which is saturated with sodium chloride and potassium chloride at room temperature (step (a)).

The ground material is pulped in the pulping vessel 2 (step (b)) with a solution which is also saturated with potassium chloride and sodium chloride.

The resulting pulp is separated in a hydrocyclone 3 (step (c)) into a fraction which contains mainly the water-insoluble impurities and a fraction which mainly contains the sodium chloride and potassium chloride crystals. On the filter 4, adhering solution is removed from the crystalline fraction, which is then removed. The filtrate and the impurities which have been separated in the hydrocyclone 3 are fed to a thickener 5, in which a separation into the impurities and a solution saturated with sodium chloride and potassium chloride is effected. The overflow (decantate) from the thickener is recycled to the wet-grinding stage 1 and/or the pulping vessel 2. The underflow from the thickener is washed with water in a releaching stage 6 and in a succeeding additional thickener 7 is separated from the aqueous solution. From the thickener 7, the impurities are discharged as a sludge. The solution which becomes available in the thickener 7 is also recycled to the wet grinding stage 1 and to the pulping vessel 2.

The crystals which become available in the filter 4 are fed to the hot-leaching stage 8 (step (d)) and are contacted therein with reheated solution from a crystallizer 13. After the hot leaching, the mixture of solids and solution is fed to a filter 9, in which the residue consisting substantially of sodium chloride is removed. The crystalline residue is then fed to the releaching stage 11, in which mother liquor from the crystallizer 13 is used to dissolve residual potassium chloride. In the separator 12, the sodium chloride is then separated from the solution which has been enriched with the residual potassium chloride. The solution is heated in a reheater 17 to a sufficiently high temperature and subsequently fed to the hot leaching stage 8.

The filtrate obtained in the filter 9 is fed to the saturator 10, which is supplied with dissolved or solid potassium chloride (step (e)).

The potassium chloride solution is thus virtually saturated and is then supplied to the crystallizer 13, in which its temperature is reduced preferably by vacuum evaporation so that potassium chloride is crystallized (step (f)).

The resulting potassium chloride after drying is then divided into a coarse fraction and a fine fraction at 14. The fine fraction is recycled to the process via the fines dissolver 15, which may be omitted if the fines are dissolved in the saturator 10. The coarse fraction is the finished product of the process. The mother liquor which becomes available in the crystallizer 13 is reheated in the reheater 16 and then supplied to the releaching stage 11.

SPECIFIC EXAMPLE

A sylvinite is processed which has the following composition in % by weight:
 KCl:28.00 to 32.00
 NaCl:60.02 to 66.35
 CaSO$_4$:1.50 to 2.50
 MgCl$_2$:0.25 to 0.38
 Insolubles:3.50 to 4.50
 Moisture:0.40 to 0.60

Throughout the example, quantities stated are rates per hour.

530 kg sylvinite are ground in the wet grinding stage 1 in the presence of 1020 kg solution which is saturated with sodium chloride and potassium chloride and which has been recycled from succeeding stages. The finely ground sylvinite has the following size distribution by weight:
 Above 0.4 mm:6%
 0.3 to 0.4 mm:10%
 0.2 to 0.3 mm:14%
 0.1 to 0.2 mm:23%
 0.06–0.1 mm:36%
 below 0.06 mm:11%

In the pulping vessel 2 (step (b)), 1803 kg of a solution which is saturated with sodium chloride and potassium chloride and has been recycled from succeeding stages is added to the finely ground material. The mixture is intensely stirred to form a pulp, which is separated in the hydrocyclone 3 into a moist crystal mass and a thinly fluid solution, which mainly contains the water-insoluble impurities. The solution which entrains the impurities becomes available in a total quantity of 2585 kg and contains 58 kg solids. This solution is fed to the thickener 5.

The moist crystal mass which becomes available in the cyclone 3 consists of 461 kg solids and 307 kg solution which adheres to the solids. On the filter 4, 210 kg of additional solution is removed from the moist crystal mass and is fed to the thickener 5. 2603 kg of solution (decantate) are separated in the thickener 5 and are recyled to the wet grinding stage 1 and the pulping vessel 2. An underflow is recovered in the thickener 5 in an amount of 191 kg and is fed to the releaching stage 6, in which 107 kg water are added to dissolve the residual potassium chloride. The resulting suspension is fed to the thickener 7, in which 219 kg solution becomes available as an overflow and, like the solution from the thickener 5, is recycled to the wet-grinding stage 1 and the pulping vessel 2. In addition, 79 kg of water-insoluble impurities is discharged as a sludge having the following composition by weight:
 KCl:5.66%
 NaCl:12.12%
 MgCl$_2$:0.44%
 CaSO$_4$:11.43%
 Insolubles:25.70%
 Water:44.65%

558 kg of moist crystal mass is recovered on the filter 4. This mass consists of 450 kg solids and 108 kg of adhering solution and is fed to the hot leaching stage 8 and treated therein with 1706 kg of a solution which comes from the crystallizer 13 and has been reheated to 111° C. in the reheater 17. This solution is passed through the reheater 16 and is reheated therein to 44° C., and through the releaching stage 11, in which it absorbs an additional 38 kg at a mixture temperature of 45° C.

2264 kg of a suspension at a temperature of 100° C. becomes available in the hot leaching stage 8 and is fed to the filter 9, in which 418 kg of crystalline residue is separated and fed to the releaching stage 11. 389 kg of common salt is removed in the filter 12, which follows the releaching stage.

1846 kg of solution are recovered from the filter 9 and are fed to the saturator 10, which is also supplied with 26 kg potassium chloride which has by-passed the fines dissolver 15.

In the saturator 10, the solution is indirectly heated at a temperature of 100° C. by means of 4 kg steam at about 3 bar. The solution is saturated with potassium chloride to a concentration corresponding to a saturation concentration at 95° C. The saturated solution is then fed to the crystallizer 13, which consists of seven stages, in which the solution is cooled to 35° C. under a progressively decreasing pressure.

To prevent a crystallization of common salt, 118 kg water are added in the first stages of the crystallizer 13. 141 kg water vapor and 164 kg crystalline potassium chloride are formed in the crystallizer 13. 26 kg of potassium chloride are recycled to the saturator. 138 kg of KCl are discharged as product.

The water vapor from the first five stages of the crystallizer 13 is used to reheat the recycled mother liquor by an indirect heat exchange.

The potassium chloride product has the following analysis by weight:
 KCl:98.13%
 NaCl:1.57%
 MgCl$_2$:0.20%
 CaSO$_4$:0.03%
 Insolubles:0.07%.

We claim:
1. A process for recovering potassium chloride from a starting material consisting predominantly of KCl and NaCl and consisting essentially of the following steps:
 (a) finely grinding the starting material;
 (b) pulping the finely ground starting material at ambient temperature with a solution which is satu- rated with sodium chloride and potassium chloride to produce a pulped mass;

(c) classifying the pulped mass formed in step (b) to produce a first phase consisting of the solution and water-insoluble impurities which are mechanically entrained by the solution and a second phase consisting of a moist salt mass which consists substantially of potassium chloride and sodium chloride and from which water-insoluble impurities have been removed to a high degree;

(d) separating the solution from the water-in-soluble impurities of step (c) and recycling the separated solution at least in part to step (b) for pulping the ground starting material therein;

(e) contacting the moist salt mass obtained in step (c) and consisting substantially of potassium chloride and sodium chloride with a solution which comes from a crystallizing stage and which is saturated with sodium chloride and potassium chloride, the contacting being carried out so that a suspension at a temperature of at least 95° C. is obtained;

(f) separating the solution enriched with potassium chloride of step (e) from a solid residue which contains mainly sodium chloride; and (g) crystallizing the solution obtained in step (f), wherein steps (e), (f) and (g) are carried out in isolation from steps (a), (b) and (c) and the water-insoluble impurities contained therein.

2. The process defined in claim 1 wherein the starting material is finely ground in step (a) so that 90% have a particle size below 1.0 mm.

3. The process defined in claim 1 wherein the starting material is finely ground in step (a) in the presence of a solution which is saturated with sodium chloride and potassium chloride and which is added in a ratio of 1.5 to 2.5 parts of the solution to each part of solids by weight.

4. The process defined in claim 1 wherein a weight ratio of 1:4 to 1:6 of starting material to solution is used for pulping in step (b).

5. The process defined in claim 4 wherein the solution obtained in step (d) is used as the solution which is saturated with sodium chloride and potassium chloride in step (b).

6. The process defined in claim 1 wherein the water-insoluble impurities are separated in step (c) in a hydrocyclone operated at a particle size of 0.06 mm.

7. The process defined in claim 1, further comprising the step of leaching the solid residue obtained in step (f) at a temperature below 50° C. to remove residual potassium chloride.

8. The process defined in claim 1, further comprising the step of virtually saturating the solution separated during step (f) with potassium chloride by an addition of potassium chloride thereto.

9. The process defined in claim 8 wherein the added potassium chloride is fine-grained potassium chloride obtained from step (g).

* * * * *